United States Patent

Ofer et al.

Patent Number: 6,098,149
Date of Patent: Aug. 1, 2000

[54] METHOD AND APPARATUS FOR EXTENDING COMMANDS IN A CACHED DISK ARRAY

[75] Inventors: Erez Ofer, Brookline; John Fitzgerald, Mansfield, both of Mass.

[73] Assignee: EMC Corporation, Hopkinton, Mass.

[21] Appl. No.: 08/874,696

[22] Filed: Jun. 13, 1997

[51] Int. Cl.[7] .................................................. G06F 12/08
[52] U.S. Cl. .......................... 711/112; 711/113; 711/114; 711/131; 711/148; 711/149; 711/173; 710/39; 710/53
[58] Field of Search .............................. 711/4, 113, 131, 711/140, 117, 112, 169, 114, 148, 149, 150, 151, 153, 129, 173; 710/53, 39

[56] References Cited

U.S. PATENT DOCUMENTS

| | | | |
|---|---|---|---|
| 4,956,803 | 9/1990 | Tayler et al. | 711/113 |
| 5,469,548 | 11/1995 | Callison et al. | 711/114 |
| 5,473,761 | 12/1995 | Parks et al. | 711/4 |
| 5,596,736 | 1/1997 | Kerns | 711/4 |
| 5,636,358 | 6/1997 | Brant et al. | 711/117 |
| 5,644,786 | 7/1997 | Gallagher et al. | 395/850 |
| 5,694,571 | 12/1997 | Fuller | 711/113 |

*Primary Examiner*—Hiep T. Nguyen
*Attorney, Agent, or Firm*—John M. Gunther; Krishnendu Gupta

[57] ABSTRACT

A method of improving storage system performance is provided. The method includes queuing asynchronous requests for data stored in physically disparate storage locations. The queue is then examined in order find those requests for data which has an acceptable level of physical proximity. Those requests having acceptable physical proximity are then bundled and transmitted as a single request a storage controller which activates the storage device and retrieves the data associated with the requests bundled into the single request.

3 Claims, 3 Drawing Sheets

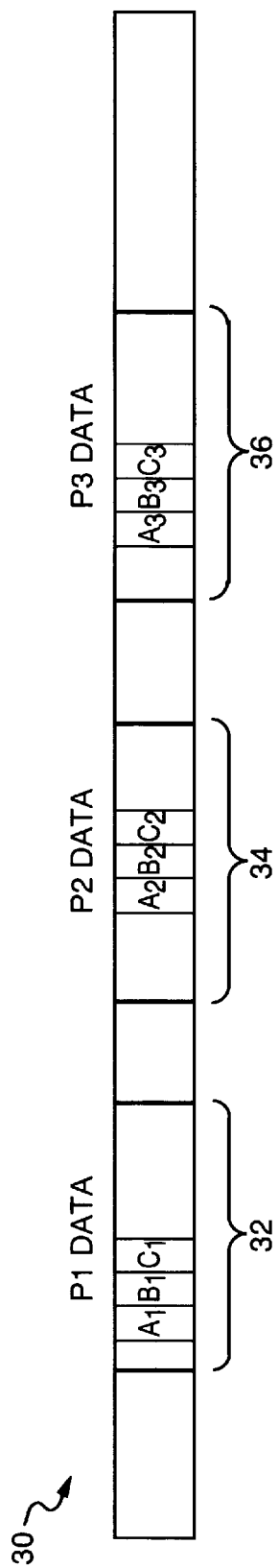

6,098,149

METHOD AND APPARATUS FOR EXTENDING COMMANDS IN A CACHED DISK ARRAY

BACKGROUND OF THE INVENTION

This invention relates generally to storage systems associated with computer systems and more particularly to providing a method and apparatus for improving controller and cache resource utilization in a cached disk array storage system.

As it is known in the art, computer systems generally include a central processing unit, a memory subsystem and a storage subsystem. According to a networked or enterprise model of a computer system, the storage subsystem associated with or in addition to a local computer system, may include a large number of independent storage devices or disks housed in a single enclosure. This array of storage devices is typically connected to several computers (or hosts) via dedicated cabling or via a network. Such a model allows for the centralization of data which is to be shared among many users and also allows a single point of maintenance for the storage functions associated with the many computer systems.

One type of storage system known in the art is one which includes a number of disk storage devices configured as an array (sometimes referred to as RAID). Such a system may include several arrays of storage devices. In addition to the arrays of storage devices, typical storage systems include several types of controllers for controlling the various aspects of the data transfers associated with the storage system. One type of controller is a host controller and provides the interface between the host computers and the storage system. Another type of controller is a disk controller which is used to manage the transfer of data to and from an associated array of storage devices (e.g. disk drives). There may be one or more disk controllers for each array of storage devices in a storage system.

In addition to the controllers described above, advanced storage systems, such as the SYMMETRIX® storage systems manufactured by EMC Corporation, may include a very large memory which is coupled to each of the controllers in the system. The memory may be used as a staging area (or cache) for the data transfers between the storage devices and the host computers and may provide a communications path between the various controllers. The above described storage systems provide superior performance to non-cache storage systems.

One problem which may arise in the storage systems described above relates to servicing requests from multiple processes running on a single host. Although the stored data associated with a particular process may have a positional locality on the storage device, there is no guarantee that there is positional locality of data between the various processes. In addition, requests for data from each of the processes may be interleaved. This combination of interleaving and positional disparity of stored data may result in a large amount of seeking by the associated storage device. Since the seek portion of a data transfer requires mechanical movement of the read/write heads associated with a disk drive, it is typically the slowest part of a data access. Thus, the more seeking required fulfill data requests, the slower the storage system will be in response to those data requests.

It would be advantageous therefore to provide a storage system, capable of supporting asynchronous requests from multiple processes running on a single host without suffering from the seek time problem described above.

SUMMARY OF THE INVENTION

In accordance with the present invention, a storage system is provided which includes a storage controller coupled to a bus and further coupled to a storage device. The storage controller responsive to requests for accessing data stored on said storage device. In addition, the storage system includes a memory and a host controller coupled to the bus. The host controller includes a request queue which is used to store requests received from a host computer for access to data stored on the storage device. The controller may receive many different requests from many different processes running on the host computer. The processes may have associated therewith sections of storage space on the storage device. The requests for data may thus cause an access to physically disparate locations on the storage device. To prevent an inordinate amount of seeking, the controller examines the queue and bundles requests to physically local locations into a single request. The bundled requests are then transmitted to the storage controller as a single request. With such an arrangement, increased storage system performance is achieved since the amount of seeking by the storage device is minimized. Additionally, the overhead associated with transmitting multiple command to the storage controller is reduced to the overhead associated with transmitting a single command to the storage controller.

BRIEF DESCRIPTION OF THE DRAWINGS

The above and further advantages of the present invention may be better understood by referring to the following description taken into conjunction with the accompanying drawings in which:

FIG. 3 is a diagrammatic representation of the partitioning of shared data storage associated with three distinct processes.

FIG. 4. is a request queue resident in a host controller of a preferred embodiment of the present invention.

DETAILED DESCRIPTION OF THE PREFERRED EMBODIMENT

Figure 1:
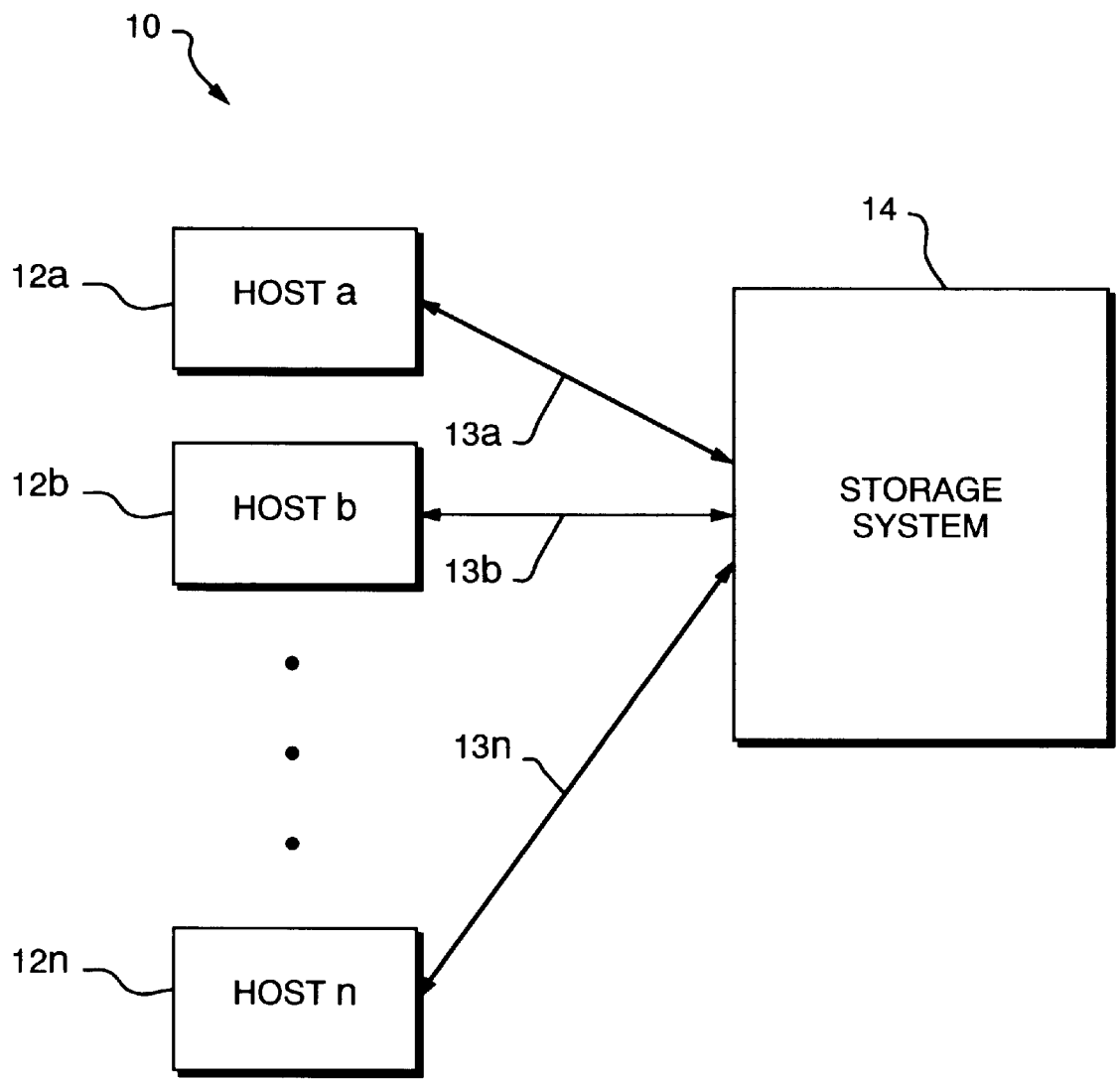
FIG. 1 is a block diagram of a computer system including a mass storage system incorporating the present invention.
Figure 2:
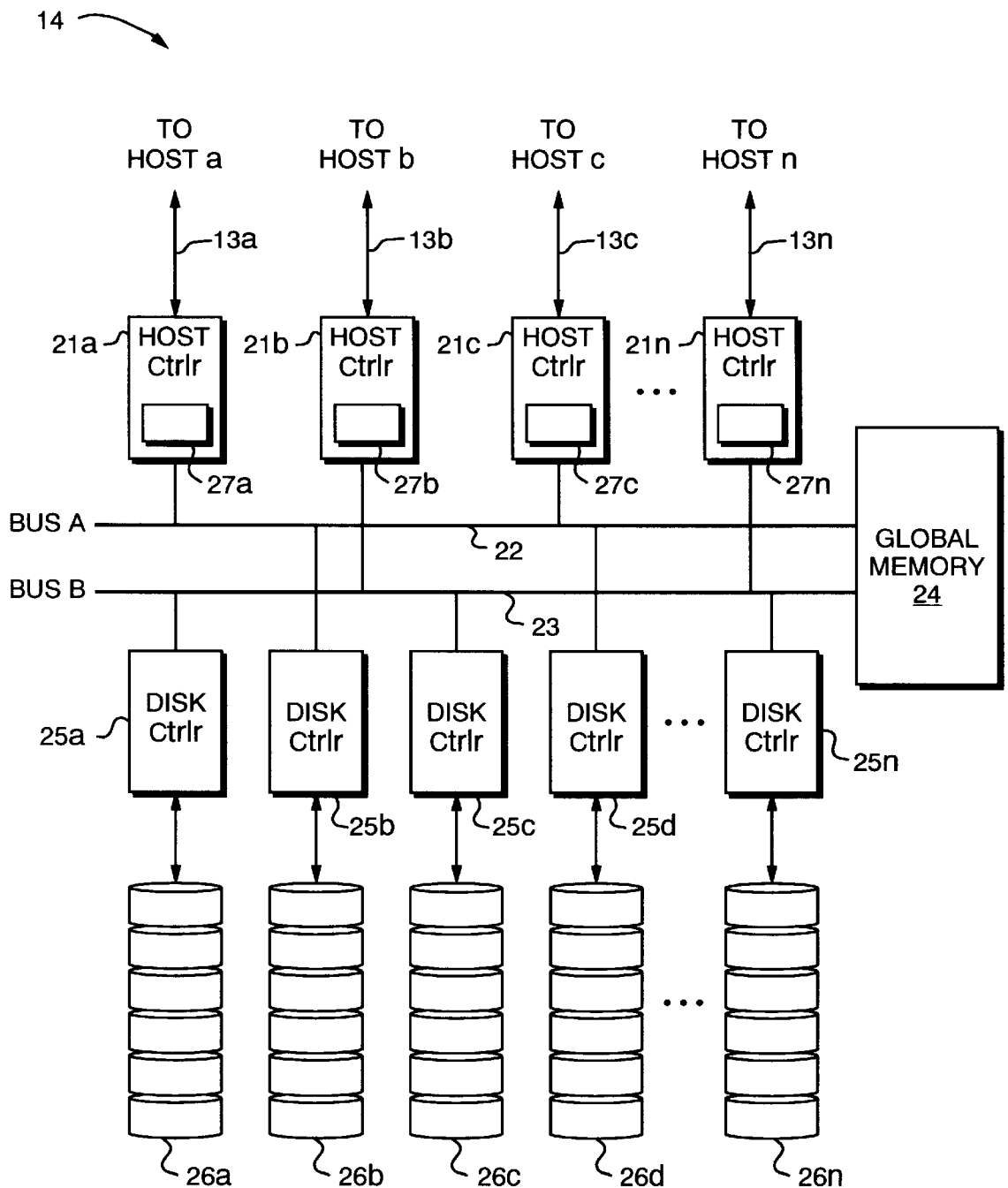
FIG. 2 is a diagrammatic representation of the storage system of FIG. 1.

Referring now to FIG. 1, computer system 10 is shown to include, among other things, a plurality of host computers 12a–12n, coupled to a storage system 14 via communication paths or busses 13a–13n respectively. The host computers may each be any of a well-known type of computer system. For example, host 12a may be a mainframe computer or may be an open-systems computer or alternatively may be a personal computer. Since each of the computer systems just mentioned typically communicates using a specific communication protocol buses 13a–13n will correspondingly be those buses specific to the computer system to which they are coupled. That is for example, assuming host 12b is an open-systems type computer system (e.g. running the UNIX Operating System) bus or communication path 13b would typically be a SCSI type communications path or a fibre-channel communications path. All communications over bus 13b would therefore adhere to either the SCSI or fibre-channel communications protocols The storage system 14 of computer system 10 may be a mass storage system which, as will be described in more detail below, includes several individual components coupled via an internal communications path. The communications path according to the preferred embodiment may include one or more buses. Referring now to FIG. 2 the storage system 14 of FIG. 1 is shown in more detail. Here the storage system includes a plurality of host controllers 21a–21n which are, according to a preferred embodiment of the present invention, coupled alternately to buses 22 and 23. Each host controller 21a–21n is responsible for managing the communication between its associated attached host computers and storage system 14. Each host controller 21a–21n may also include an internal queue 27a–27n respectively. As will be described in more detail below, the internal queue is used to store incoming requests from an attached host computer until the request can be serviced by the storage system. Also coupled alternately to buses 22 and 23 are a plurality of disk controllers 25a–25n. Coupled to each disk controller is an array of storage devices which as shown here may be magnetic disk devices. As with the host controllers described above, each disk controller is responsible for managing the communications between its associated array of disk drives and the host controllers or memory 24 of storage system 14.

In addition to the controllers described above, storage system 14 also includes a global memory 24 coupled to both buses 22 and 23. According to a preferred embodiment of the present invention, global memory 24 serves as a very large cache which is used during the transfer of data between the host computers and the storage devices of disk arrays 26a–26n.

During operation, a host computer may desire to read data from or write data to one of the disk arrays contained within the storage system 14. In order to do so, the host computer would send a request over its associated bus (for example bus 13a) to the controller attached to that bus (here controller 21a). The controller, once it receives the request from the host computer, begins performing those tasks necessary to satisfy the request. For example, if the request by the host is to write some portion of data to one of the disks in any of disk arrays 26a–26n, the host controller receiving the request would begin writing the data received from the host to the global memory 24. Once all of the data was written to global memory 24, the host controller may send an acknowledge signal back to the host computer indicating that the data was received. Sometime thereafter one of the disk controllers 26a–26n, depending on which disk array was specified by the host, will begin reading the data from the global memory and writing it to the associated target disk device. Alternately, if the request received from the host computer was to read data from one of the disk arrays 26a–26n, the host controller would first look to the global memory 24 to determine if the data was already resident in the global memory (as may be the case if a previous read was performed for the same data). If the desired data is resident in the global memory, a cache hit condition exists. When there is a cache hit, the host controller reads the data from the global memory and delivers it to the host. On the other hand, if the data was not resident in global memory, a cache miss condition would exist. When there is a cache miss, the disk controller associated with the disk having the desired data reads the data from the corresponding disk device and places the data into the global memory 24. When all of the data associated with a request has been placed in the global memory the disk controller typically notifies the host controller that is has completed the transfer of the data into the global memory. At this point, the host controller then reads the data from the global memory 24 and delivers it to the requesting host device.

Each of the host computers (not shown) coupled to the host controllers of storage system 14 is typically capable of running several processes simultaneously. That is, each host may be running several different applications programs concurrently. Typically, as is the case with the storage system of the preferred embodiment, each process running on the host computer will have assigned thereto a portion of one of the physical storage devices (e.g., disk drives) to use for reading and writing of data associated with a particular application. The area of storage typically associated with a particular process or application may be a contiguous span of storage locations within the physical storage device. However, as described earlier, the storage allocated to each process is not necessarily contiguous or may not even be in close physical proximity to each other.

Referring now to FIG. 3, a diagrammatic representation of physical storage device 30 is shown to include three distinct contiguous areas of storage 32, 34 and 36 associated with processes P1, P2 and P3 respectively, which may all be running on any one of the host computers attached to storage system 14. The diagram is intended to show the physical separation which may be present between storage areas associated with different processes running on a host computer. The physical distance may be large or small.

During operation any one of the processes P1, P2 or P3 may request to read data from storage areas 32, 34 and 36 respectively. As illustrated in FIG. 3, the portion of physical storage device 30 associated with process P1 is generally contiguous and local in nature. Similar arrangements exist for the data for process P2 and P3. Although the data may be stored contiguously for each process on storage device 30, there is no guarantee nor is there any control by storage system 14 that the requests for data received from the host computer running processes P1, P2 and P3 will come in any specific order. That is, requests to read data from storage device 30 may include requests to retrieve data from storage areas 32, 34, and 36 in a totally random order. This occurs regardless of the fact that each process may send several requests representing a read of a single contiguous section of data. Due to the multi-processing nature of the host computer, the requests generated by each process are interleaved as they are transmitted to the storage system 14. A host controller, for example host controller 21a, simply receives its requests in order from its associated attached host computer and places those requests into an internal queue 27 (FIG. 2) and services those requests as resources become available. Prior to the present invention, the host controller would dispatch the requests received from the host computer one at a time to the appropriate disk controller within the storage system in order to satisfy the data request from the host computer. It will be appreciated that servicing interleaved requests for data residing in physically separate locations requires an inordinate amount of mechanical motion for the disk head sensor in order to deliver the requested data.

Referring now to FIG. 4, a representative internal queue 40 associated with any one of the host controllers of storage system 14 is shown in more detail. Here, queue may be queue 27a (FIG. 2) and is diagrammatically represented as a plurality of entries 41 through 47. Although only eight entries are shown, it should be understood that more or fewer queue entries may be provided. The number of entries in queue Each entry in queue 40 corresponds to a request from a particular process running on a host computer attached to the host controller which has queue 40 contained therein. That is for example, entry 41 of queue 40 corresponds to a request A1 from process P1 for access to a particular piece of data stored in the corresponding assigned storage section 32

(FIG. 3). Similarly, entry 42 corresponds to a request from process P3 for a piece of data A3 which would be stored in the assigned data storage section 36 (FIG. 3). Thus, processes P1 and P3 (and also P2) represent processes running on a host computer connected the host controller which contains queue 40.

Among other things not shown, each entry in the queue identifies a particular section of data which is the target of the access. Additionally an identifier of the process which generated the access requests is also included in each entry. This information is used by the disk host controller and the disk controllers to identify the data as it is delivered from the disk to the global memory, and from the global memory to the host. As can be seen by the queue, requests from the different processes are interleaved and entered in queue 40 in no particular order.

As described above, if the host controller were to issue each of these requests for data one at a time to the associated disk controller, an inordinate amount of disk seek would result. This is evident by referring back to FIG. 3 and observing the position differences between the requested data elements $A_1$ through $C_3$ and understanding that a movement of the disk read/write head takes must occur when reading data from each of the locations. Additionally, if commands were issued one at a time from the queue to the appropriate disk controller, a certain amount of bandwidth is wasted because of the overhead associated with each of the requests for data.

In accordance with the present invention, the host controllers of storage system 14 are configured take commands from queue 40 in an order other than the order in which they are received, and issue the commands to the appropriate disk controller. That is, the controllers examine their corresponding queue 40 and determine which of those commands in the queue may be bundled together and transmitted in a single transmission to the appropriate disk controller. Commands which are typically bundled together are those commands which are requests for when viewed together represent a request for a contiguous section of data within one of the data areas associated with a particular process. In other words, requests from like processes may be grouped together.

Still referring to FIG. 4, consider the case where queue 40 is resident in host controller 21a. Host controller 21a receives access requests from an attached host (not shown) in a random fashion. When received by host controller 21a, the requests are stored in queue 40 as shown. According to the present invention host controller 21a will examine each entry of pending requests in queue 40 and determine which of those requests may be bundled together and transmitted to one of the controllers 25a through 25n.

As a specific example, consider a process P1 running on the host computer attached to host controller 21a which has issued requests for data $A_1$, $B_1$ and $C_1$ as indicated by entries 41, 45 and 47 respectively of queue 40. When host controller 21a reaches a point in its operation where it would have previously transmit the request for access to data $A_1$ it will no longer only send the request for data A1. Instead, rather than simply sending a single request for access to data $A_1$ to the appropriate disk controller, the host controller will scan queue 40 and append the requests for data $B_1$ and $C_1$ to the request for data $A_1$ and transmit that request as a package to the appropriate disk controller. That is queue entries 41, 45 and 47 will, according to the present invention, be concatenated together and transmitted to a disk controller as a single command. Upon receipt of the bundled command, the receiving disk controller will begin the reading data $A_1$ and placing that data in the global memory 24.

In accordance with preferred embodiment of the present invention rather than waiting for all data for the requests for data $A_1$, $B_1$ and $C_1$ to be placed into the cache 24, the disk controller servicing the request will notify the host controller at the point when all of the data $A_1$ has been placed into the cache 24. By providing this notification, when the data $A_1$ has been placed in the cache the host controller may begin transmitting the data back to the requesting host controller in a similar time as if it had sent the single command for access to data $A_1$. One advantage which is apparent is that while the host controller is transferring data $A_1$ to the host computer, the disk controller can be copying data $B_1$ to the cache. Thus more work may be done in the same time frame normally associated with processing a single command.

In reality even though three requests have been transmitted to the disk controller by the host controller, the host controller will operate as if the request for data $A_1$ was the only request transmitted. That is, the host controller will continue executing requests for data beyond the request for data $A_1$ as if they had yet been. However, by the time the host controller begins processing the request for data $B_1$ the data will most likely already be in the cache since the request to bring $B_1$ into the cache was sent with the request for data A, and fulfilled while the host controller was providing data $A_1$ to the requesting host. Likewise, while data $B_1$ is being transferred from the cache to requesting host, data $C_1$ will be transferred from the storage device into the cache. Thus when the host processor reaches the queue entry which requests data $C_1$, the data will be in the cache and a cache hit will result.

By concatenating the three commands for data $A_1$, $B_1$ and $C_1$, the host controller has preempted commands requesting data $A_3$, $B_3$ and $A_2$ in favor of the request for data $B_1$ which was received at a later time as indicated by its position in queue 40. However, the savings in time due to the reduced amount of mechanical disk access motion in addition to the reduced overhead transmission associated with bundling the commands more than makes up for the fact that those commands were placed behind commands that were received at a later time.

Having described a preferred embodiment of the present invention, it will now become apparent to those of skill in the art that other embodiments incorporating its concepts may be provided. It is felt therefore that this invention should not be limited to the disclosed embodiment but rather should be limited only by the spirit and scope of the appended claims.

What is claimed is:

1. A storage system comprising:
    a storage controller coupled to a bus and further coupled to a storage device, said storage controller responsive to requests for accessing data stored on said storage device;
    a host controller coupled to said bus and further including a request queue for storing a plurality of requests from a corresponding plurality of different processes for access to data stored on said storage device, said host controller responsive to receipt of said plurality of different requests bundling said requests into a subset of requests wherein each subset includes requests for data which is stored within a local storage area of said storage device assigned to a particular one of said processes.

2. A method of providing a plurality of different data elements stored at a plurality of different storage locations of a storage system to a plurality of processes running on at least one computer attached to said storage system wherein said plurality of data elements are grouped into a plurality of groups and where each group corresponds to one of said processes, said method comprising the steps of:

receiving by said storage system a plurality of requests for different ones of said data elements;

storing in a queue of said storage system, each of said requests for different ones of said data elements;

scanning said queue to determine which of said requests for different data elements correspond to like ones of said groups;

bundling ones of said requests for different data elements corresponding to a same group into a single request; and transmitting said single request to a disk controller of said storage system.

3. The method according to claim 2 further comprising the steps of:

a) retrieving by said disk controller a first one of said data elements identified in said single request;

b) copying said retrieved data element to a cache of said storage system;

c) upon completion of said copying step, notifying said storage system of said retrieval;

d) furnishing said retrieved data to one of said plurality of processes associated with said same group;

e) during said furnishing step, retrieving by said disk controller a second one of said data elements identified in said single request;

f) repeating steps b through e until all data elements identified in said single request have been furnished to said one of said plurality of processes.

* * * * *